DATA STORAGE ACCESS CONTROL APPARATUS FOR A MULTICOMPUTER SYSTEM

Filed Feb. 28, 1967

INVENTORS.
J. P. BARLOW
R. BARTON
E. J. PORCELLI
L. L. RAKOCZI
M. A. TORFEH

BY

ATTY.

3,505,651
Patented Apr. 7, 1970

3,505,651

DATA STORAGE ACCESS CONTROL APPARATUS FOR A MULTICOMPUTER SYSTEM

Jesse P. Barlow, Reseda, Calif., Richard Barton, Phoenix, Ariz., and Ernest J. Porcelli, Tustin, Laszlo L. Rakoczi, Newport Beach, and Mark Asad Torfeh, Tarzana, Calif., assignors to General Electric Company, a corporation of New York Filed Feb. 28, 1967, Ser. No. 619,377
Int. Cl. G06f 9/18
U.S. Cl. 340—172.5 5 Claims

ABSTRACT OF THE DISCLOSURE

A multicomputer data processing system in which one of the processors handles real-time events, wherein apparatus controls the access of the plural processors of the system to the system memory bank for providing the real-time processor with access to selected memories of the memory bank at a rate commensurate with the rate of a real-time event.

BACKGROUND OF THE INVENTION

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separating programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides a portion of the management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units, by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the processors become partially or totally inoperative; etc.

Each data processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the instructions during execution require the data processor to further communicate with the data storage system, either to obtain a data item on which the data processor is to perform an operation or to store a data item which is the result of an operation. Accordingly, each instruction requiring the transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

Each input/output processor of a multicomputer system performs control and data transmission operations for its respective set of input and output devices separately from the operations being performed by the other input/output processors and separately from the programs being executed by the data processors. An input/output processor controls the storage of the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

In providing the management control functions effecting transfer of data items and instructions between the plural processors and the plural data storage units of a multi-computer system, a central controller has been employed to free the processors of the burden of supporting and maintaining these management control functions. Whenever a processor is to communicate with the data storage system to receive or to transmit a data item, the processor supplies one or more signals which constitute a request by the processor to be provided communication with a data storage unit. The central controller responds to these requests and grants communication for the requesting processors with the storage units.

Only one processor at a time may be provided communication with a particular data storage unit of the storage system. Therefore, predetermined priorities are allocated to the processors by the central controller for resolving the conditions wherein two or more processors simultaneously request access to the same data storage unit. The input/output processor is allocated highest priority and, therefore, is granted access when the input/output processor and a data processor simultaneously request access to the same storage unit. However, to provide for maximum speed and efficiency of operation in servicing the rapidly and frequently occurring requests from the data processors and the input/output processor, the central controller normally will not ignore or reject requests from a particular processor merely because a higher priority processor is simultaneously requesting access to the storage system. Instead, each request is recognized if the requested storage unit is not busy, and the recognized request is stored by the central controller. If two or more of the stored requests are made for the same data storage unit, the request corresponding to the highest priority processor is first granted and communication with the requested storage unit by this processor is provided by the central controller. Immediately following completion of the communication provided for this highest priority processor, the request of the next higher priority processor requiring the same storage unit is granted by the central controller and the communication provided. Accordingly, when two or more processors simultaneously request communication with the same data storage unit, the central controller described grants the request of the lower priority requesting processors in sequence immediately after the highest priority requesting processor has completed its communication with the storage unit.

When an input/output processor is to process realtime events, it must receive or transmit data at a rate determined by one or more input or output external devices coupled thereto. When certain input devices supply data, each such item of data must be accepted by the input/output processor and stored in the data storage system within a predetermined time, or the data item will be lost. Similarly, when certain output devices receive data, each required item of data must be retrieved from the storage system and transmitted by the input/output processor within a predetermined time, or the functioning of the output device may become ineffective. Therefore, an input/output device processing real-time events must be granted communication with the storage system at the requisite real-time rate.

The central controller described above grants highest priority to the input/output processor for communication with a data storage unit when data processors at the same time request communication with the same data storage unit. However, this central controller does not permit the input/output processor to preempt a data storage unit. Instead, as described above, after the input/output processor has had granted a communication request for a data storage unit, a simultaneous request made by a data processor for the same data storage unit next will be granted. If the input/output processor immediately returns with another request for the same data storage unit, this second request will not be recognized at once because the data storage unit is busy communicating with the lower priority processor whose request was recognized, but not granted until after the input/output processor completed its first communication with the data storage unit. Similarly, if the request of a data processor is recognized and granted immediately before the input/output processor submits a request for the same data storage unit, the request of the input/ouput processor will not be recognized until the data processor completes its communication with the data storage unit. Accordingly, apparatus must be provided to insure that the input/output processor, when processing a real-time event, is granted timely access to those data storage units of the data storage system with which the input/output processor must communicate to handle data at a rate commensurate with the rate of the real-time event.

Therefore, it is an object of this invention to provide management control apparatus for enabling improved communication between the processors and the data storage units of a multicomputer system.

Another object of this invention is to provide management control apparatus for granting timely communication between the plural processors and the data storage system of a multicomputer system.

Another object of this invention is to provide management control apparatus for insuring that timely communication with selected data storage units of the data storage system is provided for a processor handling real-time events in a multicomputer system.

Another object of this invention is to provide apparatus for granting to an input/output processor timely access to the required data storage units of a multicomputer system.

SUMMARY OF THE INVENTION

The foregoing objects are achieved, according to one embodiment of the instant invention, by providing in a multicomputer system, apparatus for granting to the input/output processor exclusive communication with the required data storage units. In a multicomputer system, a central controller is coupled to a plurality of data processors, to an input/output processor, and to a data storage system. The central controller provides controllable transmission of data words between each of the processors and the storage system. Each processor supplies a request signal when communication is required with the storage system.

The central controller normally recognizes and stores each processor request if the requested data storage unit is not busy, and grants each stored request, if the request is for a unique storage unit. If two or more stored requests are directed to the same storage unit the central controller grants communication to these requests in sequence according to the respective allocated priorities of processors originating these requests. However, when the input/output processor must service a real-time event, it transmits "service mode" signal to the central controller to provide notification that the input/output processor requires exclusive communication with certain of the storage units to handle data for a real-time event.

A "scope" switch is provided for each storage unit. A storage unit is designated for the reserved scope of the input/output processor by the manual setting or automatic electrical activation of its corresponding scope switch. A scope switch which is set or activated delivers a corresponding "scope" signal. The set of scope signals being delivered at any time identifies the set of storage units within the reserved scope of the input/output processor.

In response to the service mode signal, the central controller is prevented from recognizing all requests by data processors for communication with any storage unit identified by a scope signal, so long as the service mode signal persists. Thus, the input/output processor is provided with uninterrupted access to the reserved data storage units of the data storage system to enable timely processing of the real-time events, and the storage units not required by the input/output processor remain free for communication with the data processors.

Certain portions of the apparatus herein disclosed are not of our invention, but are the inventions of:

S. F. Aranyi, J. P. Barlow, L. L. Rakoczi, L. A. Hittel, and M. A. Torfeh, as defined by the claims of their application, Ser. No. 623,284, filed Mar. 15, 1967; and J. R. Hudson, L. L. Rakoczi, and D. L. Sansbury, as defined by the claims of their application, Ser. No. 646,504, filed June 16, 1967; all such applications being assigned to the assignee of the present application.

BRIEF DESCRIPTION OF THE DRAWING

The invention will be described with reference to the accompanying drawings, wherein.

Figure 1:
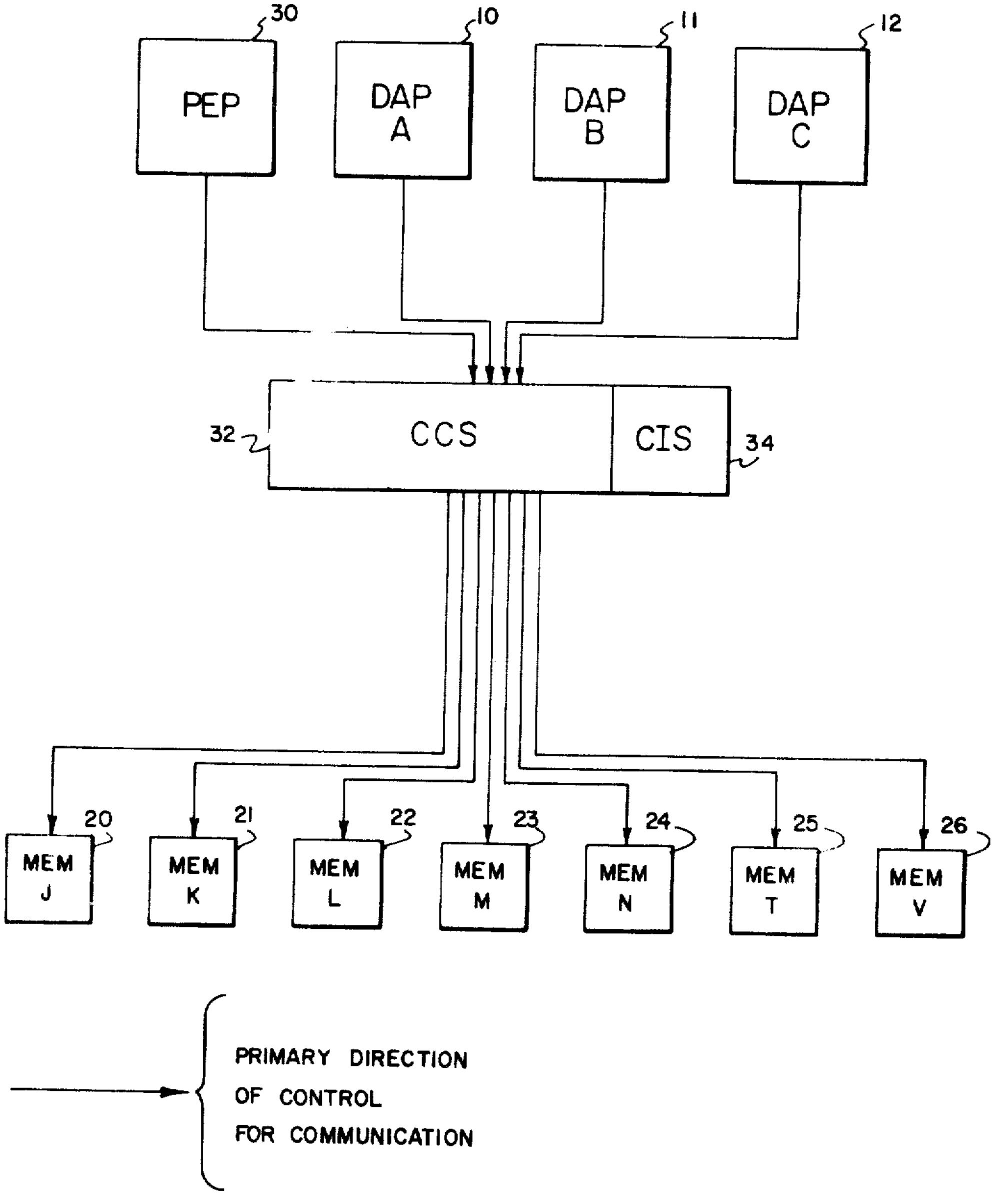
FIGURE 1 is a block diagram of a multicomputer data processing system to which the instant invention is applicable.

For a complete description of the system of FIGURE 1 and of my invention, reference is made to U.S. Patent application, Ser. No. 542,768, now Patent No. 3,444,525, filed Apr. 15, 1966, entitled, "Centrally Controlled Multicomputer System," by Jesse P. Barlow, Richard Barton, John E. Belt, Carlton R. Frasier, Lorenz A. Hittel, Laszlo L. Rakoczi, Mark A. Torfeh, and Jerome B. Wiener, and assigned to the assignee of the present invention. More particularly, attention is directed to FIGURES 2 through 110 of the drawings and to the specification beginning at page B–1, line 5, and ending at page N–64, line 16, inclusive of U.S. Patent application, Ser. No. 542,768, which are incorporated herein by reference and made a part hereof as if fully set forth herein.

We claim:

1. In combination, a plurality of data storage members, each of said storage members storing a data word in one of a respective plurality of storage cells, at least one data processor, said data processor being adapted to receive data words, to execute a sequence of different processing operations on received data words in response to a corresponding sequence of data words representing instructions, and to generate data words representing the processed results of said operation; and an input-output processor for executing a sequence of operations for receiving and transmitting data words; a central controller coupled to each of said processors and to each of said storage members for providing controllable transmission of data words between said processors and said storage members, each one of said processors supplying a request signal when a communication is required thereby with one of said storage members, said central controller normally being enabled to respond to each of said request signals to provide the required communication between the corresponding processor and the requested storage member, said input-output processor selectively generating service mode signals for a predetermined period of time when said input-output processor requires exclusive communication with at least one of said storage members; and means for producing a scope signal designating each of said plurality of storage members, means for supplying said service mode and said scope signals to said central controller, the concurrence of said signals causing said central controller to inhibit communication with the data storage members designated by the scope signals by said data processors while permitting the input-output processor to communicate with the data storage member designated by the scope signals.

2. The combination of claim 1 in which the length of the period the service mode signal is produced permits a predetermined number of data words to be communicated between the said input-output processor and any one of said data storage members.

3. In combination, a plurality of data storage members, each of said storage members storing a data word in each one of a respective plurality of storage cells, a plurality of data processing units, and data transmission apparatus for providing controllable communication between each of said processors and any one of said storage members, said apparatus enabling said processing units to receive data words from and to transmit data words to said storage members; one of said processors having means for selectively generating a service mode signal having a predetermined period of duration when said one of said processing units requires exclusive communication with at least one of said storage members, circuit means for selectively generating a scope signal for each of said storage members, said data transmission apparatus responsive to the conjoint occurrence of the service mode signal and each of said scope signals for causing said apparatus to inhibit communication between the other ones of said processing units and storage members corresponding to said scope signals while permitting said one of said processing units to communicate with the storage member corresponding to said scope signals.

4. For employment with a plurality of data storage members, each of said storage members storing a data word in each one of a respective plurality of storage cells, a plurality of data processing units, and data transmission apparatus for providing controllable communication between each of said processing units and any one of said storage members, said communication enabling said processing units to receive data words from and transmit data words to said storage members, the combination comprising: means for selectively generating a signal for each of at least two of said storage members, and means responsive to said signals for controlling said transmission apparatus to inhibit communication between all except one of said processing units and the storage members corresponding to said signals.

5. For employment with a plurality of data storage members, each of said storage members storing a data word in each one of a respective plurality of storage cells, a plurality of data processing units, and data transmission apparatus for providing controllable communication between each of said processing units and any one of said storage members, said communication enabling said processing units to receive data words from and transmit data words to said storage members, the combination comprising: means for selectively generating a first signal when one of said processing units is to be granted exclusive communication with at least one of said storage members, means for selectively generating a second signal for each of at least two of said storage members, and means responsive to the conjoint occurrence of said first signal and each of said second signals for controlling said transmission apparatus to inhibit communication between the other ones of said processing units and the storage members corresponding to said second signals.

References Cited

UNITED STATES PATENTS

| | | | |
|---|---|---|---|
| 3,226,687 | 12/1965 | Amdahl et al. | 340—172.5 |
| 3,274,554 | 9/1966 | Hopper et al. | 340—172.5 |
| 3,323,109 | 5/1967 | Hecht et al. | 340—172.5 |

PAUL J. HENON, Primary Examiner

R. F. CHAPURAN, Assistant Examiner